United States Patent Office 3,447,608
Patented June 3, 1969

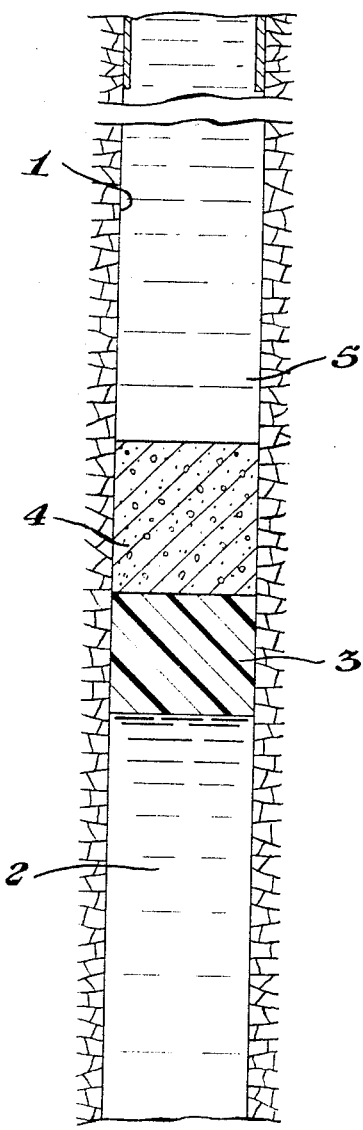

3,447,608
OPEN HOLE CEMENT PLUGGING
William Charles David Fry and Patrick Neilan Parker, Tulsa, Okla., and William M. Ross, Jr., Metairie, and Jimmy H. Parry, Morgan City, La., assignors to The Dow Chemical Company, Midland, Mich., a corporation of Delaware
Filed Apr. 15, 1966, Ser. No. 542,892
Int. Cl. E21b 33/13
U.S. Cl. 166—293                 7 Claims

ABSTRACT OF THE DISCLOSURE

The improved method of emplacing a cement plug in a mud-containing open hole which comprises first positioning a temporary plug in the hole comprising an aqueous liquid and a cohesively cementitiously relatively low-density autonomously solidifying particulate material slurried therein which sets relatively quickly to a solid of relatively low strength but of greater supporting strength than the mud in the hole and, after allowing the emplaced slurry to solidify, emplacing a relatively high density, relatively high strength and relatively slow setting cement slurry on top of the temporary plug to form a more-or-less permanent plug.

---

The invention is an improved method of plugging open holes.

Open holes, e.g. oil or gas wells, often require that a cement plug be placed therein. Illustrative of situations wherein a cement plug is desired to be placed in open holes includes whipstocking, well recompletion, and water shut-off.

To place a plug in an open hole, a distance from the bottom of the hole, employing a settable slurry, it is necessary that this slurry be located and retained at the desired level until sufficiently set to be self-supporting.

A problem that has been long associated with placement of cement plugs in open holes has been the difficulty of preventing the plug, in a process of being positioned, from falling through the mud into the lower part of the hole. Wherein attempts have been made to solve the problem by lowering the density of the cement slurry being positioned in the hole to a sufficient amount by low density for it to remain in the upper part of the mud, the compressive strength of the cement when set has been reduced to the point where the plug is too weak to satisfy the requirements for which it was being used.

The principal object of the invention is to provide an improved method for emplacing a cement plug of adequate strength in an open hole. The invention is primarily directed to use in a wellbore containing mud in the lower portion thereof or into which mud is pumped prior to positioning the plug. However, a plug may be positioned, in accordance with the invention at a desired level relatively near the bottom of a hole, in the absence of mud, in accordance with the practice of the invention.

Almost invariably, a hole to be plugged off contains some mud. Accordingly, the invention will be described in general in relation to a hole containing some mud.

The way by which this and related objects are attained is made clear in the ensuing description defined in the appended claims.

The invention, broadly, in its preferred embodiment consists of locating, in a mud-containing hole, to be cemented off, a temporary plug having a density not substantially greater than the mud, in position just below the place wherein a cement shut-off is desired and locating a more-or-less permanent cement plug on top of the temporary plug. The term "more-or-less permanent" plug, as used herein, refers to a plug of high strength and durability suitable for prolonged use, usually until it is drilled out or otherwise positively removed or the well is abandoned.

The annexed drawing shows wellbore 1 having mud 2 in the lower part thereof and temporary plug 3 in the upper part of the mud and more-or-less permanent cement plug 4 resting on the temporary plug. Sometimes, as shown, some less dense mud or water 5 may be present above the permanent cement plug.

The material of which the temporary plug is made is a material which is of lighter density than the more-or-less permanent plug. It is not of substantially greater density than the mud and is preferably of about the same or of lighter weight than the mud in the hole. Some of the materials which may be used are of sufficient inherent strength to be used alone or, in some instances, they are advisedly mixed with portland or aluminous cement. The preferred materials to employ for preparing the temporary plug are (1) a mixture of hydraulic cement and a suitable light-weight extender, e.g. bentonite, pozzolana, diatomaceous earth, perlite, or gilsonite, or (2) a linear or cross-linked acrylamide polymer-glycol or polymer-glycerol system containing some water or (3) a cross-linked acrylamide polymer-selected brine system. The density of the material for use in making the temporary plug may be readily adjusted either by varying the ratio of the ingredients where portland cement is a constituent thereof or by adding a desired amount of a weighting agent, e.g. BaSO$_4$, in the case of the systems containing the acrylamide polymer.

The term acrylamide polymer, as used herein, includes various homopolymers and copolymers of acrylamide or methacrylamide, e.g. as described in U.S. Patents 2,706,186, 2,713,041, 2,780,610, or 2,798,058. The term also includes, for use in the invention, such carbamoyl polymers as the N-substituted acrylamides, e.g. N-methyl acrylamide and N-propyl acrylamide and copolymers of acrylamide or methacrylamide with another ethylenically unsaturated monomer, e.g. acrylic acid, methacrylic acid, vinylsulfonic acid, vinylbenzylsulfonic acid, vinylbenzenesulfonic acid, or alkali or alkaline earth metal salts wherein the acrylamide or methacrylamide provides more than 50 percent by weight of the monomeric mixture. The term also includes the cross-linked acrylamide polymers employing in the polymerization thereof such cross-linking agents as methylenebisacrylamide, divinylbenzene, vinyl ether, divinyl ether of ethylene glycol, and the like, as described more fully in the above-numbered patents. The glycols which may be employed with the acrylamide polymer include ethylene glycol, propylene glycol, and trimethylene glycol; glycerol also may be used. Some water is required to be present. The amount of water necessary for the polymer and glycol or glycerol mixture to form a solid gel for use in making the temporary plug, is rather small, as little as 2 percent by weight being satisfactory. Not over 10 percent of water is recommended since higher amounts of water result in gel times which may be too fast to control while injecting the slurry in position. It is recommended that some polyglycol be employed in the polymer-glycol or polymer-glycerol system, e.g. diethyleneglycol, triethylene glycol, or tetraethylene glycol of a molecular weight approaching about 10,000, or propylene oxide polymers of a molecular weight approaching about 2,000, so long as the polyglycol is a liquid.

The recommended procedure for preparing the polymer-glycol or polymer-glycerol, system is to admix a glycol or the glycerol, e.g. ethylene glycol, containing 2 to 10 percent by weight of water, with a polyglycol, e.g. diethylene glycol, and then add the polymer, e.g. polyacrylamide in a particulated state in an amount of between about 0.3 to 1 part by weight of polymer, either linear or cross-linked, per part of glycol-polyglycol mixture. Between about 0.4 and 0.6 part of the polymer per part of glycol or glycerol or mixture thereof is recommended. It is suggested that 40 to 60 parts by weight of the glycol or glycerol be used with 60 to 40 parts by weight of the polyglycol; about 50:50 by weight is quite satisfactory. Mixing at any temperature at which the glycols are liquid and the gel time is not too fast may be used, ambient temperature usually being employed. The composition so made gels to a solid between about 30 minutes to an hour at 70° F. to 80° F. and within somewhat less time at higher temperatures.

When the cross-linked acrylamide polymer-selected brine type temporary plug is used, the polymer may be prepared and admixed with the selected brine, e.g. an aqueous solution of $CaCl_2$ and $FeCl_3$, preferably substantially saturated, as described briefly in Example 6 hereinafter and more fully in application Ser. No. 371,665, filed June 1, 1964, now U.S. Patent No. 3,306,870.

The materials for preparing the more-or-less permanent plug are those used in conventional cement plugging including any one or mixture of Class A to Class G cements as classified in API RP 10B, 14th edition. The proportions by weight of water in the aqueous cement slurry employed are between about 35 and about 55 parts of water per 100 parts of dry cement, a proportion of 46 parts of water to 100 parts of the cement being illustrative. Fluid-loss additives, e.g. as described in U.S. Patent 3,140,269, may advisably be used therewith. The more-or-less permanent plug is placed in position by injecting the aqueous cement slurry by the use of conventional equipment according to conventional procedures.

The density of the mud in a borehole, in which a cement plug is to be placed, is usually known. If not, it can be readily ascertained by sampling the mud and weighing a given volume. A fluid composition suitable for forming the temporary plug is then prepared and pumped into place employing equipment and general borehole plugging procedures. After the temporary plug has been allowed to set sufficiently to support the cement plug of a permanent type (which may require no more than about 20 minutes to an hour) the permanent plug material in a slurry state is pumped down the hole and brought to rest on the temporary plug.

The following examples illustrate the process of the invention. It is to be understood that the examples are only for purposes of illustration and are not limitations. Other hydraulic cements, extenders, and light-weight polymers which gel to a solid of sufficient strength to support an aqueous hydraulic cement slurry during the setting time thereof may be employed.

The choice of materials employed for both the temporary plug and the selection of cement for the more-or-less permanent plug is dependent upon those which are deemed to be most suitable to meet the borehole conditions, e.g. depth and temperature.

EXAMPLE 1

Bentonite, a natural montmorillonite clay, is admixed with an API cement, e.g. Class A (a general purpose portland cement), and the resulting mixture thereafter admixed with water employing the following amounts:

| | Pounds |
| --- | --- |
| Bentonite | 12 |
| Water | 102 |
| Class A cement | 100 |

The resulting slurry has a density of 12.6 pounds per gallon.

The slurry so prepared in an amount sufficient to provide a plug of adequate length, usually between about 25 and 75 feet vertically in the wellbore, is pumped down the borehole and brought to rest in the upper part of the mud therein. The cement slurry containing the bentonite is allowed to stand for a time sufficient for it to acquire strength to support the subsequently injected permanent plug material. The length of waiting time varies with well conditions and materials used and, as aforesaid, may be as little as 20 to 30 minutes.

Thereafter, an aqueous cement slurry, consisting of 100 parts of Class A cement and 46 parts of water, is prepared and pumped down the wellbore and brought to rest on top of the, at least partially set, temporary bentonite-cement plug. The well is then closed in until the cement slurry has set to provide the more permanent plug.

EXAMPLE 2

Example 1 is repeated except that the bentonite is prehydrated by admixing it with water for about 2 to 4 hours. Thereafter the water containing the then prehydrated bentonite (with which additional water may be admixed if needed), in an amount of about 3 parts of prehydrated bentonite in 102 gallons, is admixed with 100 parts by weight of Class A cement. The slurry so made is pumped down the wellbore and positioned in the upper part of the mud therein, allowed to set at least partially and is then followed by an aqueous cement slurry consisting of Class A cement and water substantially as performed in Example 1, i.e. it is pumped down the well and brought to rest on the bentonite-cement plug.

EXAMPLE 3

In this example, water is admixed with gilsonite, a type of natural asphalt (of the nature of that obtained in the Unital basin of Utah), and having the following specifications:

| | |
| --- | --- |
| Specific gravity | 1.07 |
| Bulk density, pounds per cubic foot | 50 |
| Absolute volume, cubic foot per 50 pounds | 0.75 |
| Melting point, ° F. | 385 |

It is usually particulated to a mesh size ranging between about 4 mesh and about 100 mesh, U.S. Bureau of Standards Screen Series.

The proportions of the gilsonite and the water employed may vary, but 50 pounds of gilsonite with between about 50 and 60 pounds of water are usually used. This amount of gilsonite-water slurry so made is then admixed with 100 parts of hydraulic cement. A composition consisting of 50 pounds of gilsonite, 58 pounds of water and 100 pounds of portland cement has a density of about 12.43 pounds per gallon.

In the practice of the invention, this prepared slurry is pumped down a wellbore, having mud therein and requiring a cement plug, into the upper part of the mud and is allowed to set sufficiently long to support the subsequently emplaced more-or-less permanent cement plug. Thereafter an aqueous hydraulic cement slurry comprising for example, 100 parts of portland cement, e.g. Class A, and 46 parts of water is injected down the wellbore and positioned on top of the temporary plug.

EXAMPLE 4

This example is substantially the same as Example 3 except that it consists of a mixture of both gilsonite and bentonite with hydraulic cement in water. The amounts employed are as follows:

| | Pounds |
|---|---|
| Gilsonite | 100 |
| Bentonite | 12 |
| Water | 135.5 |
| Portland cement | 100 |

Usually the bentonite and gilsonite are admixed with water and the resulting slurry admixed with the cement. The density of the slurry employing the amounts, used as illustrative above, is about 10.77 pounds per gallon. As in the previous examples, this slurry is pumped down the wellbore in an amount sufficient to provide a plug of adequate length, say 50 feet, in the wellbore in the upper part of the mud and allowed to set (i.e. harden) sufficiently to support the required amount of conventional aqueous cement slurry pumped down the well to provide a more-or-less permanent plug. Thereafter, an aqueous cement slurry comprising, for example, 100 parts of portland cement and 46 parts of water by weight is pumped down the well and brought to rest on top of the temporary plug.

EXAMPLE 5

Pulverized granules of polyacrylamide are admixed with a mixture of about 50:50 parts by weight of ethylene glycol (containing between about 2% and 10% by weight water) and diethylene glycol, to provide about 0.3 part of the polymer per part by weight of the glycol mixture. The resulting slurry is pumped down a wellbore, containing mud in the lower part thereof, for the purpose of providing a temporary plug therein in accordance with the practice of the invention. After allowing the temporary plug so provided to gel for a period of about 30 minutes or longer, an aqueous slurry consisting of 100 parts portland cement, e.g. Class A and 46 parts of water is prepared and pumped down the borehole coming to rest on top of the temporary plug.

EXAMPLE 6

A temporary plugging composition employing a polymer dispersed in a brine solution, according to Ser. No. 371,665, filed June 1, 1965, now U.S. Patent No. 3,306,870 is prepared as follows: Acrylamide is polymerized with between about 500 and 5000 parts by weight of N,N'-methylenebisacrylamide as a cross-linking agent, per million parts by weight of acrylamide, in sufficient water to make a 30 to 60 percent by weight aqueous solution. Polymerization is conducted under a nitrogen blanket. A cross-linked polymer is thereby made. It is then admixed with a substantially saturated solution of $FeCl_3$ and $CaCl_2$ (40 percent $CaCl_2$ and 43 percent $FeCl_3$) by weight in an amount of about 4 pounds of the polymer per gallon of the aqueous solution at room temperature. (Higher temperatures may be used but the resulting accelerated gel rate, due to such higher temperature, must be kept in mind.) Any of the other polymers admixed with any of the other aqueous salt solutions as described in Ser. No. 371,665 may be employed to provide the temporary open hole plug in accordance with the practice of the present invention without departing from the spirit of the invention; when such other polymer-brine solutions are used, comparable results are obtained.

The composition so emplaced is allowed to stand during which it gels to a solid within about 20 minutes to an hour, dependent upon the temperature of the formation. Thereafter, a slurry of an hydraulic cement of Class A to G as described in API RP 10B (selected on the basis of wellbore conditions e.g. temperatures) is pumped down on top of the gelled polymer and allowed to remain substantially undisturbed until set, usually for between about 12 to 24 hours, dependent on the type of cement employed and the temperature of the formation.

Reference to the examples shows that a relatively lightweight cement slurry which sets to a unitary solid plug of adequate strength to provide a firm site for a subsequently injected slurry of relatively high density cement slurry settable to a high strength plugging solid (without danger of it sinking down to the bottom of the mud that is present in the wellbore and without danger of contaminating the cement) may now be advantageously employed in accordance with the invention.

Where it is desired to practice the invention wherein none, or only a relatively small amount of mud is present in a wellbore, mud may be pumped into the wellbore (prior to positioning the temporary plug) to provide the desirable amount of mud to serve as a cushion at the desired level for positioning the temporary plug. Similarly where too much mud is present to permit placement of the permanent plug at the desired level in a substantial uncontaminated state, some mud may be pumped out of the wellbore prior to positioning the temporary plug.

Having described our invention what we claim and desire to protect by Letters Patent is:

1. The method of emplacing a cement plug in an open hole which comprises preparing and positioning in the hole just below the desired location of said cement plug a temporary plug by injecting an aqueous slurry comprising (A) a liquid selected from water and brines and (B) an ingredient, which sets to a low-density solid from an aqueous slurry, selected from the class consisting of particulate (1) mineral material which is cohesively cementitious when wet and is of less-density than portland cement, (2) bituminous and asphaltic materials (3) polymers that gel to a solid subsequent to contact with a liquid selected from the class consisting of water, brines, and water in admixture with liquid hydroxy compounds selected from the class consisting of alkylene glycols, polyalkyleneglycols, and glycerol, and (4) portland cement in admixture with ingredients selected from the class consisting of (1) and (2) and mixtures thereof which slurry sets to a solid of a density not greater than that of the mud in the borehole; allowing the slurry thus positioned to solidify sufficiently to support an aqueous slurry of an hydraulic cement; locating on the temporary plug so provided an aqueous slurry of an hydraulic cement in proportions of between 35 and 65 parts of water per 100 parts of the cement and allowing the cement slurry thus positioned to set to a unitary solid to form a more-or-less permanent cement plug.

2. The method according to claim 1 wherein said ingredient which sets to a low-density solid is a mixture of portland cement and a relatively light-density ingredient selected from the class consisting of (1) a cohesively cementitious mineral material that sets to a solid of less density than portland cement, (2) bituminous and asphaltic materials, and (3) mixtures of (1) and (2) in proportions of the portland cement to said light-density ingredient to provide a solid plug of a density not substantially greater than that of the mud in the lower part of the open hole.

3. The method according to claim 1 wherein said liquid, identified as A, is a substantially saturated solution of both $FeCl_3$ and $CaCl_2$ and said low-density solid, identified as B, is polymerized acrylamide cross-linked with between about 500 and 5000 parts of a diolefinic cross-linking agent, per million parts by weight of acrylamide.

4. The method according to claim 1 wherein said low density solid, identified as B, is a polymer made by admixing between about 0.3 and 1.0 part of polymerized acrylamide with 1 part by weight of a mixture of alkylene glycols, polyalkylene glycols, and water in a ratio of between 40 and 60 percent of each of the alkylene glycols and polyalkylene glycols and at least 2 percent by weight of water to make a 100 percent liquid mixture.

5. The method according to claim 1 wherein said low-density solid, identified as (B), is pozzolana cement.

6. The method according to claim 1 wherein said low-density solid, identified as (B) is bentonite.

7. The method according to claim 1 wherein said low-density solid is a mixture of bentonite, gilsonite, and pozzolana cement.

References Cited

UNITED STATES PATENTS

| | | | |
|---|---|---|---|
| 2,075,882 | 4/1937 | Brantly | 166—29 |
| 2,206,389 | 7/1940 | Cannon | 166—29 |
| 2,219,325 | 10/1940 | Maness | 166—33 X |
| 2,236,987 | 4/1941 | Bechtold | 166—31 |
| 2,880,096 | 3/1959 | Hurley | 166—31 |
| 2,985,239 | 5/1961 | Shell | 166—31 |
| 3,036,633 | 5/1962 | Mayhew | 166—31 |
| 3,079,268 | 2/1963 | Brooks | 166—31 X |
| 3,140,269 | 7/1964 | Wahl et al. | 166—31 X |
| 3,220,863 | 11/1965 | Mayhew | 166—31 X |

STEPHEN J. NOVOSAD, *Primary Examiner.*

U.S. Cl. X.R.

166—294, 295